June 28, 1927.  H. COULLERY  1,634,019
CALIPER
Filed March 19, 1923
Fig.1.  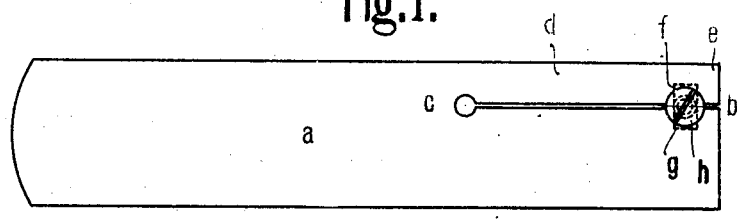  Fig.2. 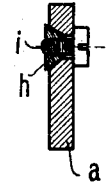
Fig.3. 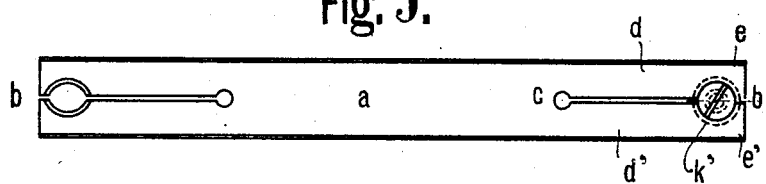  Fig.4. 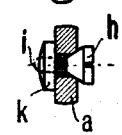
Fig.5. 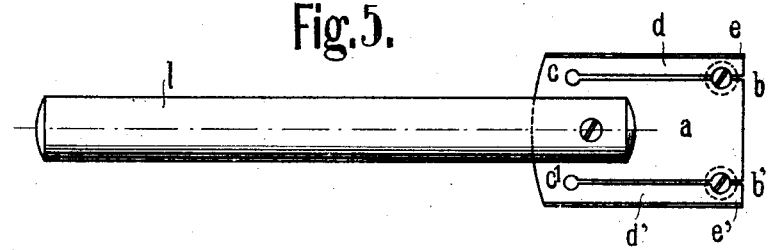  Fig.6. 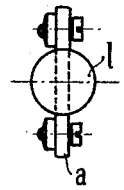
Fig.7 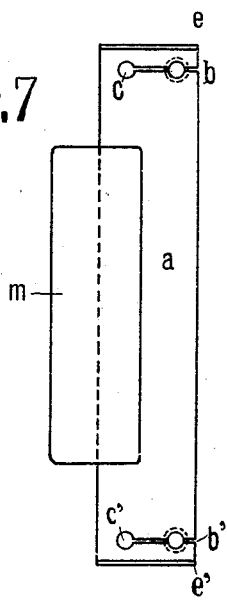  Fig.8. 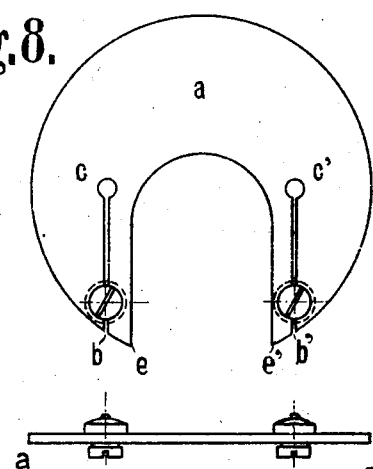
Fig.9.
Inventor:
H. Coullery Patented June 28, 1927.

1,634,019

UNITED STATES PATENT OFFICE.

HENRI COULLERY, OF LA CHAUX DE FONDS, SWITZERLAND.

CALIPER.

Application filed March 19, 1923, Serial No. 626,159½, and in Switzerland March 21, 1922.

In spite of all the improvements applied to the measuring implements in use for mechanical constructions, the old outside and inside caliper still continues to be employed in its primitive form for verifying by the feeling whether the dimensions of a worked piece are quite equal to those of a pattern piece, or for numerically determining these dimensions by referring to calibrated gauges. If the caliper does not determine in an accurate and invariable way the prescribed dimensions and the admitted tolerances as the hole-gauges, ring-gauges and jaw-calipers do; if it does not give in a direct way, as in the case of graduated instruments, the absolute or differential dimensions in numeral value, it has on the other hand the advantage of being a "universally" light and very handy instrument. Being thin, its feelers penetrate everywhere, permitting of local verifications, for instance to measure the diameter of a narrow groove or with rounded bottom, to see whether a bore is quite cylindric, if it is not oval or conic. Last of all its construction is simple and economic.

The great defect of the caliper is that owing to its elasticity and its lack of rigidity, it requires an experienced hand, a careful handling and great attention, in order to get the most advantage out of its use, so much the more, as its feelers are not guided automatically on the piece to be measured, as in the case of the feelers of the other instruments of an extended, rigorously geometrical surface.

The subject of this invention is an instrument which realizes as much as possible those qualities of the calipers mentioned above, allied with the facility of orientation and specially the rigidity of the calipers now in use.

The attached drawing gives, by way of example, some forms of execution of the invention.

Fig. 1 represents a face view, Fig. 2 a transversal section through the new caliper, constructed for the inside measurement between even surfaces.

Figs. 3 and 4 indicate a face view and a transversal section of a double caliper for bores of small diameters.

Figs. 5 and 6 represent an elevation and a side view of the third form of execution of the caliper intended for deep holes.

Fig. 7 is a face view of the caliper in the form suiting large bores.

Figs. 8 and 9 give a face and a plan view of the form of execution intended for exterior diameters and the thicknesses.

In the form of execution represented by Figs. 1 and 2, the caliper is formed by the plate $a$, made for instance of steel plate and split from $b$ to $c$, in order to render the part $d$ flexible, the extremity $e$ of which serves as feeler. Slots $f$ and $g$ are practiced in the two parts of the plate, on the borders of the fissure, in order to form a hole to lodge the wedge $h$, at rectangular section for instance. This wedge serves for the purpose of an adjusting nut of the screw $i$, the head of which leans against the face of the caliper opposite to the face where the wedge penetrates. By tightening the screw, the wedge makes the part $d$ to give way, and thus separates the feelers $e$ and $e'$, from each other. The elasticity of the flexible part reapproaches the feelers when the screw is released.

In the form of execution in Figs. 3 and 4 the plate $a$ is narrow enough for the fissure practiced in its middle part to produce the flection of both feelers. Here the wedge is constituted by the conical part $h$ of the head of the screw $i$, whose nut $k$ leans by its even face against the plate $a$. The inlets $f$ and $g$ holding the wedge, have the form indicated on the left extremity of the plate, where the screw and its nut are taken off; they are bored with a tool of the same form as the conical wedge, after having separated the two feelers as much as possible from each other. The friction of the screw nut against the face of the caliper is sufficient to prevent its turning round whilst tightening or loosening the screw.

In the three forms of execution represented in Figs. 5–9, the expansibility has been increased by making two fissures, in order to render flexible the two parts holding the feelers, in spite of the great width of the plate.

The handle I, Fig. 5, made of wood, light metal tube, etc., is convenient for measuring long bores. The handle $m$ of the caliper Fig. 7 for bores of great diameters, made of non-conducting materal, prevents the errors arising from dilatation by the heat of the hand.

In all these calipers, the screw and its nut can be disposed as indicated in Figs. 1–4. The wedge could also be constituted by a conical part of the screw-nut. For the particular case of gauges of big dimensions, one can also use a conical or differently shaped wedge, not forming a whole body either with the screw or the nut. In this case the wedge is pierced by a non-threaded hole through which the screw passes its head freely, or the nut leaning against the head of the wedge. Finally one could use a double wedge, for instance by making the head of the screw in Fig. 2 or the screw nut in Fig. 4 of a conical shape.

Whichever may be the adopted junction for the wedge, the screw and its nut, this arrangement fulfils a double function; it serves for regulating the distance of the feelers and at the same time it supports the flexible part $d$, in order to prevent it from giving normally way to the faces of the caliper. This flexible part being supported near its free extremity, cannot give way either parallelly to the faces of the caliper under the pressure sustained by the feelers.

The whole realizes therefore a rigid caliper, even by making the plate $a$ very thin, either in order to obtain feelers being able to pass everywhere, and a light and handy tool, or in order to facilitate its manufacturing and render same economical.

The expansibility of the caliper is rather narrowly limited by the dimensions of the wedge. The result is that the borders of the calipers remain almost parallel in the proximity of the feelers, even when the feelers are regulated to the maximum of a possible widening; therefore they always guide the caliper when in use. By measuring the diameter of a hole for instance, the line $e\ e'$ of the feelers can only deviate from the perpendicular of the axis of the hole by a minimum quantity, without influencing the exactitude of the measure.

In all the forms of execution represented, the angles of the plate are forming the feelers; however, it is evident that these parts could be made of any other form judged convenient, or one could use specially manufactured feelers.

I claim:

1. A caliper gage having a slot intersecting one of its edges, a conical shaped wedge, a beveled seat for said wedge, the axis of said seat and said wedge coinciding with the median line of said slot, and means for drawing said wedge into said seat for increasing the length of the intersected edge.

2. A caliper gage having a relatively long slot intersecting one of its edges, a conical shaped wedge, a beveled seat for said wedge in close proximity to the intersected edge, the axis of said seat and said wedge coinciding with the median line of said slot, and screw-threaded means for drawing said wedge into said seat for increasing the length of the intersected edge.

HENRI COULLERY.